US010834337B2

(12) United States Patent
Wadelius

(10) Patent No.: US 10,834,337 B2
(45) Date of Patent: Nov. 10, 2020

(54) DYNAMIC FRAME RATE CONTROLLED THERMAL IMAGING SYSTEMS AND METHODS

(71) Applicant: FLIR Systems AB, Taby (SE)

(72) Inventor: Urban Wadelius, Vallentuna (SE)

(73) Assignee: FLIR Systems AB, Taby (SE)

( * ) Notice: Subject to any disclaimer, the term of this patent is extended or adjusted under 35 U.S.C. 154(b) by 28 days.

(21) Appl. No.: 15/997,001

(22) Filed: Jun. 4, 2018

(65) Prior Publication Data

US 2018/0288339 A1 Oct. 4, 2018

Related U.S. Application Data

(63) Continuation of application No. PCT/US2016/066002, filed on Dec. 9, 2016.

(60) Provisional application No. 62/265,214, filed on Dec. 9, 2015.

(51) Int. Cl.
| | |
|---|---|
| *G06T 7/13* | (2017.01) |
| *H04N 5/00* | (2011.01) |
| *H04N 5/33* | (2006.01) |
| *H04N 5/235* | (2006.01) |
| *H04N 5/353* | (2011.01) |
| *G09G 5/393* | (2006.01) |
| *H04N 5/232* | (2006.01) |
| *H04N 7/01* | (2006.01) |

(52) U.S. Cl.
CPC ............. *H04N 5/33* (2013.01); *G06T 7/13* (2017.01); *G09G 5/393* (2013.01); *H04N 5/2327* (2013.01); *H04N 5/2353* (2013.01); *H04N 5/23254* (2013.01); *H04N 5/353* (2013.01); *H04N 7/0127* (2013.01); *G06T 2207/10048* (2013.01); *G06T 2207/20092* (2013.01); *G09G 2320/10* (2013.01); *G09G 2340/0435* (2013.01)

(58) Field of Classification Search
CPC .................. H04N 5/33; H04N 5/23232; G06T 2207/10048
USPC ....................................................... 348/164
See application file for complete search history.

(56) References Cited

U.S. PATENT DOCUMENTS

| | | | | |
|---|---|---|---|---|
| 2006/0291693 | A1* | 12/2006 | Olson ................... | G06K 9/6203 382/103 |
| 2007/0103543 | A1* | 5/2007 | Anderson ............ | H04N 5/2251 348/36 |
| 2007/0120058 | A1* | 5/2007 | Blackwell ......... | H01L 27/14603 250/338.1 |

(Continued)

FOREIGN PATENT DOCUMENTS

| | | |
|---|---|---|
| WO | WO 2003/077552 | 9/2003 |
| WO | WO 2013/055274 | 4/2013 |

*Primary Examiner* — Jeffery A Williams
(74) *Attorney, Agent, or Firm* — Haynes and Boone, LLP

(57) ABSTRACT

A thermal imaging apparatus and a method of improving image quality in a thermal image video sequence imaging a scene, determining one or more of an image detail level, a degree of image motion and/or an image signal level of one or more captured thermal images; determining, based on one or more of the image detail level, the degree of image motion and/or the image signal level, an adapted frame rate for the capturing of one or more subsequent thermal images for the video sequence; capturing one or more subsequent thermal images at the adapted frame rate to improve the image quality in the video sequence.

17 Claims, 4 Drawing Sheets

(56) References Cited

U.S. PATENT DOCUMENTS

| | | | |
|---|---|---|---|
| 2008/0068520 A1* | 3/2008 | Minikey, Jr. | B60R 1/12 349/11 |
| 2009/0180012 A1* | 7/2009 | Ino | H04N 5/232 348/300 |
| 2011/0081043 A1* | 4/2011 | Sabol | G06T 7/254 382/103 |
| 2012/0133776 A1 | 5/2012 | Cicchi et al. | |
| 2012/0249801 A1* | 10/2012 | Nozaki | G06T 5/008 348/164 |
| 2013/0321627 A1 | 12/2013 | Turn, Jr. et al. | |
| 2014/0240515 A1 | 8/2014 | Steurer | |
| 2015/0363928 A1* | 12/2015 | Mestha | G01J 5/10 382/128 |
| 2016/0217588 A1* | 7/2016 | Hay | G06F 3/04847 |

* cited by examiner

DYNAMIC FRAME RATE CONTROLLED THERMAL IMAGING SYSTEMS AND METHODS

CROSS-REFERENCE TO RELATED APPLICATIONS

This application is a continuation of International Patent Application No. PCT/US2016/066002 filed Dec. 9, 2016 and entitled "DYNAMIC FRAME RATE CONTROLLED THERMAL IMAGING SYSTEMS AND METHODS," which is incorporated herein by reference in its entirety.

International Patent Application No. PCT/US2016/066002 filed Dec. 9, 2016 claims priority to and the benefit of U.S. Provisional Patent Application No. 62/265,214 filed Dec. 9, 2015 and entitled "DYNAMIC FRAME RATE CONTROLLED THERMAL IMAGING SYSTEMS AND METHODS," which is incorporated herein by reference in its entirety.

TECHNICAL FIELD

The present disclosure relates generally to thermal imaging techniques, and in particular to systems and methods for imaging scenes with varying imaging conditions and varying level of motion in the scene.

BACKGROUND

Thermal, such as infrared (IR), images of scenes are often useful for example for monitoring, inspection and/or maintenance purposes and surveillance. Typically, a thermal imaging apparatus, for example in the form of a thermal imaging device such as an IR camera, is provided to capture a series of thermal images and produce a thermal video sequence, where the thermal images comprise pixels with data values representing thermal radiation emitted from an observed real world scene.

A problem with conventional thermal imaging devices is that imaging of scenes with low contrast, for example imaging when monitoring scenes from a large distance or monitoring scenes during cold or humid weather conditions, may produce low resolution and generally low quality thermal images that are hard to interpret. Further, when imaging scenes where there is motion involved, motion blur may occur for example due to movement of the thermal imaging device or to moving objects in the scene.

There is a need to provide an improved thermal imaging apparatus that overcomes the above mentioned problems.

SUMMARY

The present disclosure comprises embodiments that may solve or at least reduce the problems mentioned above.

Embodiments of the disclosure address different thermal image quality aspects, such as low resolution, motion blur and detail representation. Such thermal image quality aspects may be affected by the frame rate used when capturing thermal images in the video sequence. However, a frame rate that is suitable for one quality aspect may be inappropriate for one or more of the other quality aspects. One or more embodiments achieve improvements in overall image quality by adapting the frame rate to the imaged scene and/or to the current use case.

Embodiments of the disclosure achieve improvement of image quality in a video sequence of thermal images captured using a thermal imaging system, by determining one or more of an image detail level, a degree of image motion and/or an image signal level of one or more captured thermal images. Based on one or more of the determined image detail level, the determined degree of image motion and/or the determined image signal level, an adapted frame rate for the capturing of one or more subsequent thermal images for the video sequence is determined, and one or more subsequent thermal images are captured at the adapted frame rate to improve the image quality in the video sequence.

In embodiments of the disclosure, the determining of an image detail level comprises determining an image detail measure, the determining of a degree of image motion comprises determining an image motion measure; the determining of an image signal level comprises determining an image signal level measure; and the determining of an adapted frame rate for the capturing of one or more subsequent thermal images is based on one or more of the image detail measure, the image motion measure and the image signal level measure.

In embodiments the determining of an image detail measure comprises determining an edge detection measure. The edge detection measure may be determined based on a Prewitt operator or a Sobel operator.

In embodiments the determining of an image motion measure is based on difference image calculation, and/or on one or more of an image sharpness measure and/or an image blurriness measure.

In one or more embodiments the determining of an image signal level measure is based on one or more of: a maximum pixel value based on the pixel values of at least one thermal image; and/or a minimum pixel value based on the pixel values of least one thermal image; and/or an average pixel value based on the pixel values of at least one thermal image. In one or more embodiments, determining an image signal level measure comprises generating a histogram based on the pixel values of at least one thermal image and determining the image signal level measure based on the histogram.

One or more embodiments further comprise: receiving a user parameter via an user parameter input interface; controlling, based on the received user parameter, the determining of one or more of the image detail measure, the image motion measure, the image signal level measure and/or the adapted frame rate.

In one or more embodiments, the determining of an adapted frame rate comprises: determining, based on a set of rules and on one or more of the image detail measure, the motion measure and/or the image signal measure, an integration time for the capturing of thermal images for imaging the scene; determining an adapted frame rate based on the determined integration time.

In one or more embodiments, the determining of an adapted frame rate comprises: determining, based on one or more of the image detail measure, the image motion measure and/or the image signal level measure, whether a frame rate step condition is fulfilled; decreasing, if a negative step condition is fulfilled, the current frame rate by a step value delta_frame_rate to the adapted frame rate; increasing, if a positive step condition is fulfilled, the current frame rate by a step value delta_frame_rate to the adapted frame rate.

One or more embodiments further comprise configuring a sequence of thermal images captured at the adapted frame rate into an output video sequence having an output video frame rate.

Further embodiments comprise a non-transitory machine-readable medium on which is stored machine-readable code which, when executed by a processor of a thermal imaging apparatus, causes the processor to perform any of the method embodiments of the disclosure. Further embodiments comprise a computer program product having computer program code portions configured to control a processor to perform any of the method embodiments of the disclosure.

Embodiments of the disclosure comprise a thermal imaging apparatus configured to improve image quality in a video sequence of captured thermal images. Such embodiments comprise: a thermal imaging system configured to capture one or more thermal images for a video sequence imaging a scene; and a processor communicatively coupled to the thermal imaging system and configured to determine one or more of an image detail level, a degree of image motion and/or an image signal level of one or more captured thermal images; to determine, based on one or more of the image detail level, the degree of image motion and/or the image signal level, an adapted frame rate for the capturing of one or more subsequent thermal images for the video sequence, and to capture one or more subsequent thermal images at the adapted frame rate to improve the image quality in the video sequence.

Embodiments of the disclosure achieve improvement of image quality in a video sequence of thermal images captured using a thermal imaging system, by determining one or more of an image detail level, a degree of image motion and/or an image signal level of one or more captured thermal images. Based on one or more of the determined image detail level, the determined degree of image motion and/or the determined image signal level, an adapted frame rate for the capturing of one or more subsequent thermal images for the video sequence is determined, and one or more subsequent thermal images are captured at the adapted frame rate to improve the image quality in the video sequence.

In one or more embodiments, the processor is further configured to: determine an image detail level by determining an image detail measure, to determine a degree of image motion by determining an image motion measure; to determine an image signal level by determining an image signal level measure; and to determine an adapted frame rate for the capturing of one or more subsequent thermal images based on one or more of the image detail measure, the image motion measure and the image signal level measure.

In further embodiments of a thermal imaging apparatus the processor is further configured to perform any of the method embodiments of the disclosure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Introduction

Figure 1:
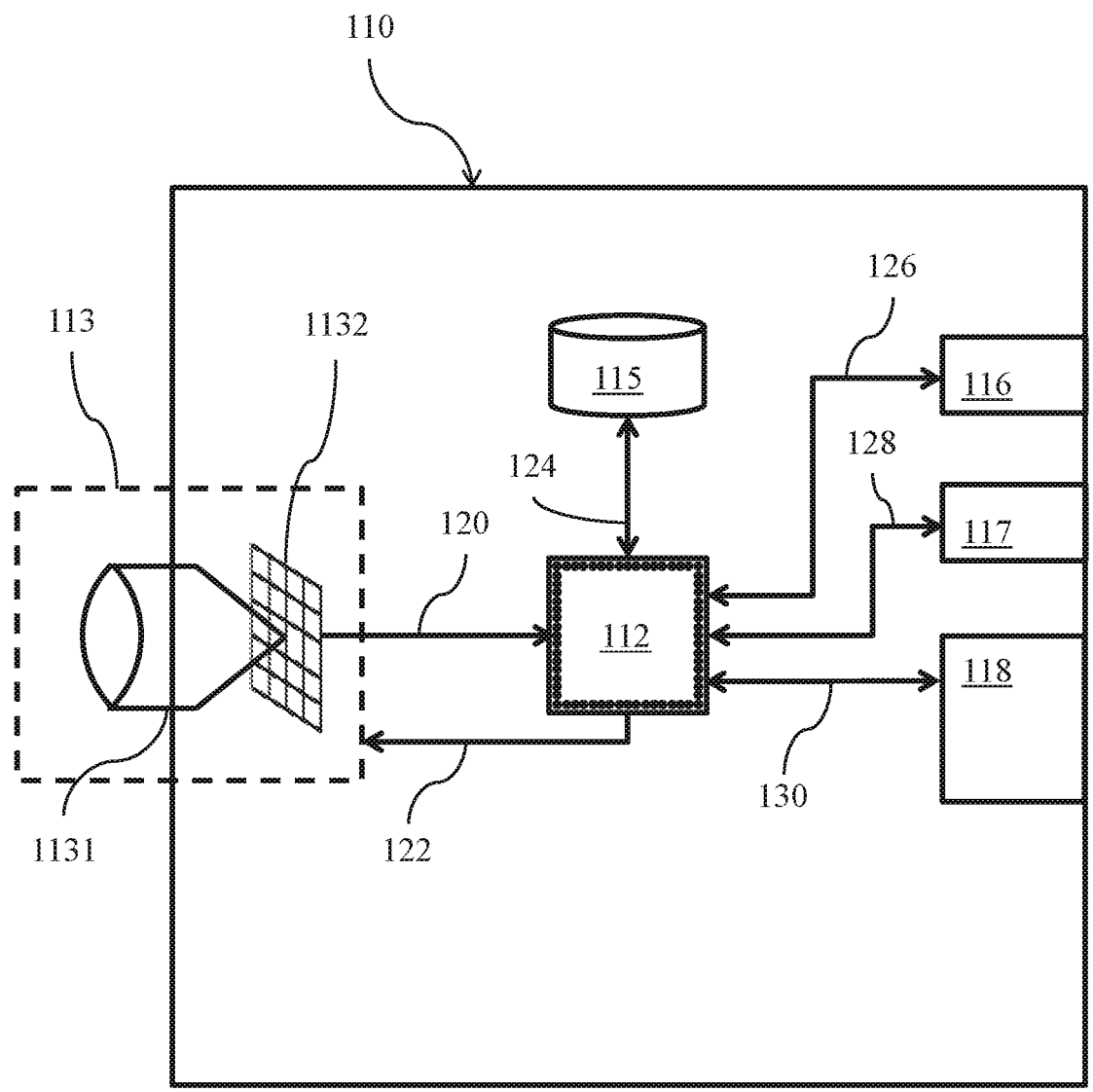
FIG. 1 shows a schematic view of a thermal imaging apparatus according to one or more embodiments of the disclosure.

Thermal images, such as infrared (IR) images, in a video sequence captured by means of a thermal imaging system may suffer from low quality caused by low contrast, motion blur or fuzzy details. This may for example be due to a low image signal or to a low frame rate for the capturing of images. A thermal image captured by a thermal imaging system may for example be represented in an instance of a data structure called an image frame or an image data frame that comprises pixels of image data values that represent thermal radiation emitted or reflected from a scene and received by a thermal radiation detector. In this context a thermal image capturing frame rate refers to the rate at which images, or image frames, are captured in a sequence by means of a thermal radiation detector.

The quality of images in a thermal image video sequence may depend on the conditions in an imaged scene, for example the occurrence or the degree of motion or movement in the scene, low contrast scenes due to lighting or color conditions, cold scenes or hot scenes, dry or humid scenes. The image quality may also depend on the use case application or the conditions of operating the thermal imaging apparatus, for example a use case application of surveillance or inspection, imaging at a short or long viewing distance to the scene, imaging with a handheld or fixedly mounted thermal imaging apparatus or imaging when the thermal imaging apparatus is affected by vibrations.

In a thermal image that depicts a mainly stationary scene, a lower image capturing frame rate allowing a longer integration time may be desired. In thermal image capturing, an integration time for some thermal imaging apparatuses may include the time during which received photons are added up (e.g., accumulated and/or integrated) to form an image signal level that is output from a thermal radiation detector in a thermal imaging apparatus, such as for example in case of an infrared (IR) photodetector (e.g., a quantum well IR photodetector, or "QWIP") in an IR camera, and captured as one or more pixel values in a captured thermal image. An integration time for some thermal imaging apparatuses may include the time during which an intermediate signal generated by a thermal radiation detector, such as for example in case of a bolometer, is integrated, amplified, and/or averaged to produce an image signal level for the thermal radiation detector in an IR camera, and captured as one or more pixel values in a captured thermal image. The longest possible integration time for an image frame is limited by the frame rate, and therefore the maximum obtainable signal level in a thermal image depicting a scene is also limited by the frame rate. In thermal imaging of a scene involving moving objects or a large amount of details, a higher image capturing frame rate may be desired.

In thermal imaging apparatus the operating frame rate or a range of an available frame rate may be limited according to settings or design parameters. In thermal imaging apparatus a thermal image capturing frame rate, e.g., the rate at which a sequence of thermal images are captured by a thermal imaging system and read out to a processor, may be related to an output video frame rate, e.g., an output frame rate used to output a thermal image video sequence to an output device for example to a storage device, to a presentation display or to an interface thereof.

Embodiments of systems and methods of the disclosure improve the quality of images in a thermal image video sequence by controlling the capturing of thermal images for the video sequence with an image capturing frame rate that is adapted to the imaged scene and/or to a current use case application based on quality aspects determined for captured thermal images. In embodiments, the frame rate used to capture thermal images is controlled independently of an output video frame rate for a communications interface, thereby allowing the image capturing frame rate to be adapted more freely. In one or more embodiments, this is achieved by determining a frame rate for the capturing of one or more subsequent thermal images for the video sequence based on quality aspects in the form of an image detail level, a degree of image motion and/or an image signal level of one or more captured thermal images of the video sequence. Embodiments of the disclosure further achieve a balanced image quality in instances when conditions in the imaged scene and certain use case applications give rise to conflicting requirements on the capturing of thermal images.

FIG. 1 shows a schematic view of a thermal imaging apparatus 110 according to one or more embodiments of the disclosure. In embodiments, the thermal imaging apparatus 110 comprises a thermal imaging system 113, for example in the form of an infrared (IR) imaging system in an infrared (IR) camera. The thermal imaging system 113 is configured to capture thermal images, for example infrared (IR) images, represented in the form of pixels of thermal image data values representing thermal radiation, for example infrared radiation, emitted from a scene. The thermal imaging system 113 is further communicatively coupled to a processor 112, the communicative coupling being illustrated in FIG. 1 as communication lines 120,122. The processor 112 may be implemented with any appropriate architecture, for example with an ASIC, with a general purpose central processing unit (CPU), a field programmable gate array (FPGA), a graphics processing unit (GPU), a microcontroller, a digital signal processor (DSP) or combinations of hardware and software processing functionality. In these and other embodiments, the processor 112 may be provided with or communicatively coupled to other components where appropriate, for example volatile or non-volatile memory, one or more interfaces such as thermal radiation detector interfaces, storage device interfaces or image presentation display interfaces.

In embodiments the thermal imaging system 113 is further configured to receive control data or control signals from the processor 112 via the communication line 122. For example, the thermal imaging system 113 may be configured to trigger the capturing of a thermal image of a scene in response to such control data or control signals from the processor 112. In embodiments the thermal imaging system 113 is further configured to communicate a plurality of pixels in a signal frame, for example in the form of a thermal image frame of thermal image data values as a captured thermal image, to the processor 112 via communication line 120. In embodiments, the processor 112 may be provided with specifically designed programming or program code portions adapted to control the processor 112 or be configured to perform steps, functions and/or methods of embodiments of the disclosure described herein. In embodiments, the thermal imaging apparatus 110 further comprises at least one memory 115 that is configured to store program code portions and/or data values and/or parameters received from the processor 112, and that is communicatively coupled as illustrated by communication line 124 to the processor 112 for retrieval and/or storage of data.

In embodiments, the thermal imaging apparatus 110 further comprises a communications interface 116 communicatively coupled as illustrated by communication line 126 to the processor 112 and configured to send or receive data values or parameters to and/or from the processor 112 or to and/or from units or sensors that are comprised in or that are external to the thermal imaging apparatus. In one or more embodiments the thermal imaging apparatus 110 further comprises an input device 117 that is communicatively coupled as illustrated by communication line 128 to the processor 112 and configured to receive input or indications from a user, for example input or indications constituting control commands. In one or more embodiments the thermal imaging apparatus 110 further comprises a display 118 that is communicatively coupled as illustrated by communication line 130 to the processor 112 and configured to display image data received from the processor 112 as a displayed image, for example to display a visual representation of a thermal image or a series of thermal images in a video sequence to a user of the thermal imaging apparatus 110. In embodiments a display 118 is integrated with a user input device 117 and configured to display images and to receive input or indications from a user, for example by applying touch screen functionality in a display configured to send and receive signals or data to and from the processor 112. In operation, the display 118 receives thermal image data from the processor 112 at an output video frame rate and communicates with the processor 112 via communication line 130 in accordance with a display communication protocol. In embodiments of displays that are provided with touch screen functionality the display may also communicate with the processor 112 in accordance with a touch screen communication protocol. In an example as shown in FIG. 1, the thermal imaging system 113 includes an optical system 1131, for example comprising a lens, zoom functionality and focus functionality, together with a corresponding thermal radiation detector 1132 such as an infrared (IR) detector, for example comprising a micro-bolometer focal plane array or a QWIP focal plane array. In one or more embodiments, thermal radiation includes electromagnetic radiation in the infrared wavelength band such as 700 nm-1 mm.

Figure 2:
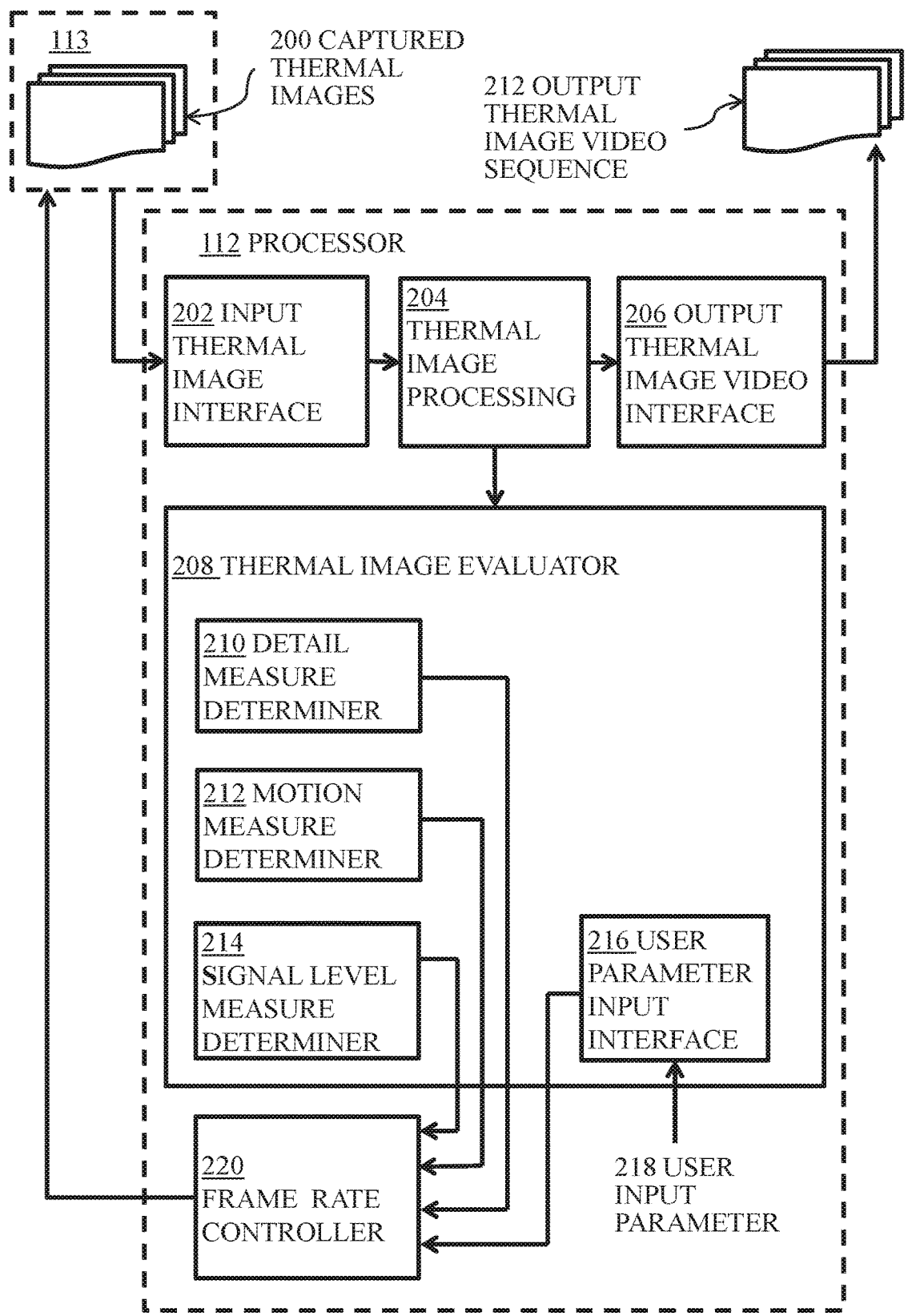
FIG. 2 shows a schematic view of a thermal imaging apparatus with a functional block diagram illustrating functional components comprised in or performed by a processor of a thermal imaging apparatus according to one or more embodiments of the disclosure.

FIG. 2 shows schematically a block diagram illustrating functional components comprised in or performed by a processor 112 comprised in a thermal imaging apparatus according to one or more embodiments presented herein. The illustrated functional components comprise embodiments of methods disclosed herein, and may be implemented by means of software, hardware or a combination of software and hardware. In one or more embodiments, the processor 112 is configured to perform the methods of the functional components. The functional components are communicatively coupled, comprising communicative couplings as illustrated by arrowed lines in FIG. 2. A sequence of thermal images 200 captured by a thermal imaging system 113 schematically shown in FIG. 2 with intermittent lines is input to an input thermal image interface 202, for example comprising an intermediate frame buffer. In embodiments, the IR images may for example be received from the thermal imaging system 113, from an external memory (not shown) or from a memory 115 comprised in the thermal imaging system as shown in FIG. 1.

Thermal Image Processing

The captured thermal images are received and processed in a thermal image processing component 204, for example comprising aligning received images by an aligner (not shown), combining successive thermal images, calculating a thermal image average, applying temporal thermal image filtering and/or providing images with a pseudo color for presentation to a human observer and/or configuring the captured thermal images to a video sequence, and are thereafter output via an output video sequence interface 206 as an output thermal image video sequence 212. The output thermal image video sequence 212 may for example be communicated to a video storage device or to a presentation display as described in conjunction with FIG. 1.

Aligning is performed when capturing a sequence of thermal images to compensate for small movements of the thermal imaging apparatus between the capturing of subsequent thermal images. Under such circumstances the thermal images are captured from slightly different positions and/or directions. Therefore the offset, direction and rotation around the optical axis may differ slightly, resulting in a parallax error between subsequent thermal images in the sequence. Such parallax errors may make image processing operations, such as those exemplified herein, difficult as the pixel values in subsequent thermal images with the same pixel coordinates may represent different objects or scene subsets of the observed scene. Parallax errors may comprise parallax distance error, parallax pointing error and parallax rotation error. In order to combine the thermal images in a sequence, for example in order to discern what is a movement in the scene, the images may be aligned so that at least an image part that is common in the sequence represent the same part of the scene. This processing is referred to as image registration or spatial alignment, i.e. the process of transforming different sets of data pertaining to subsequent thermal images into one coordinate system through a coordinate transform, resulting in that pixels from thermal images being captured at different points in time and having the same pixel coordinates represent the same object in the scene or the same subset of the scene. Thereby reduced complexity for processing thermal images is obtained. Registration or alignment can be performed according to any method known to a skilled person in the art, for example intensity-based, feature-based registration using linear or elastic transformations.

In operation, captured thermal images received in the thermal image processing component 204 may be provided with temporal indices, for example in ascending order such that a current thermal image has a higher temporal index than a subsequently captured thermal image thus denoting the latter thermal image having been captured at a later point in time. For example, with this notation as used herein, a thermal image with temporal index $T_n$ may be aligned to a previously captured IR image with temporal index $T_{n-1}$. In one or more embodiments, the thermal image processing component 204 may be configured to generate a thermal image temporal average based on a current thermal image and a set of previously captured thermal images. In one example, a first pixel value with an associated pixel coordinate in a current thermal image with temporal index $T_n$ is combined with a second pixel value with the same associated pixel coordinate in a previously captured thermal image with temporal index $T_{n-1}$ to form a thermal image temporal average pixel value with the same associated pixel coordinate. This may be expressed for example as:

$$\text{temporal average pixel value} = 0.5 \cdot \text{first pixel value} + 0.5 \cdot \text{second pixel value}$$

In embodiments, the combining may then be repeated for all pixel coordinates of the IR image temporal average.

Thermal Image Evaluation

From the thermal image processing component 204, received thermal images and/or processed thermal images and/or image data calculated or derived from captured thermal images are communicated to a thermal image evaluator component 208 configured to evaluate received thermal images with regard to image quality aspects such as image detail level, degree of image motion, image signal level and/or parameters such as user input parameters that are indicative of the current imaged scene and/or the current use case application at hand when capturing the respective received images. For this purpose, the thermal image evaluator component 208 comprises one or more of: a detail measure determiner 210 configured to determine an image detail measure; a motion measure determiner 212 configured to determine an image motion measure; an image signal level measure determiner 214 configured to determine an image signal level measure; and/or a user parameter input interface 216 configured to receive one or more user input parameters 218 for controlling the determining of one or more of an image detail measure, an image motion measure, an image signal level measure and/or an adapted frame rate. The measures and/or parameters are communicated to a frame rate controller 220 that is configured to determine an adapted image capturing frame rate based on one or more of the measures and/or parameters. For this purpose the thermal image evaluator component 208 and/or the detail measure determiner 210, and/or the motion measure determiner 212 and/or the signal level determiner 214, and/or the user parameter input interface 216 are communicatively coupled with and configured to communicate the image signal measure and/or user parameters to the thermal image apparatus frame rate controller 220. The frame rate controller 220 is further communicatively coupled to the thermal imaging system 113 and is configured to control the capturing of thermal images at the determined adapted image capturing frame rate. The adapted frame rate may be altered, e.g. increased or decreased, or unaltered from the previous frame rate.

Figure 3:
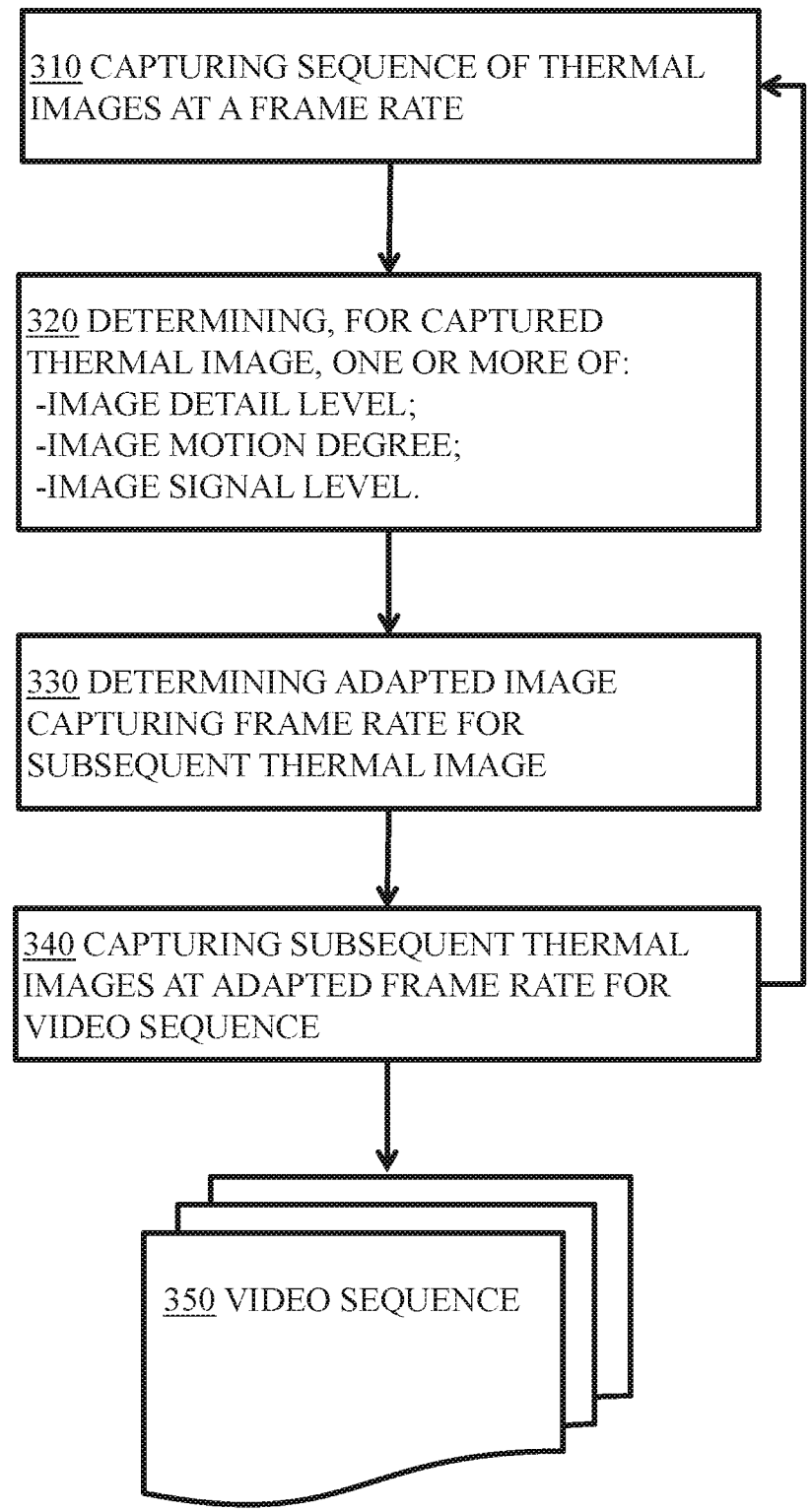
FIG. 3 shows a flowchart of a method according to one or more embodiments of the disclosure.

FIG. 3 shows a flowchart illustrating method embodiments, performed by means of a thermal imaging apparatus, as presented and exemplified herein in the above and below description and drawings. Embodiments of a method of improving image quality in a video sequence of thermal images captured using a thermal imaging system as illustrated by FIG. 3, comprise:

At block 310, capturing a sequence of thermal images at a current frame rate.

At block 320, determining one or more of an image detail level, a degree of image motion and/or an image signal level of one or more captured thermal images. The determining of the image detail level may comprise determining an image detail measure. The determining of a degree of image motion may comprise determining an image motion measure. The determining of an image signal level may comprise determining an image signal measure.

At block 330, determining, based on one or more of the image detail level, the degree of image motion and/or the image signal level, an adapted frame rate for the capturing of one or more subsequent thermal images for the video sequence. In embodiments, the determining of an adapted frame rate is based on one or more of a determined image signal level measure, an image motion measure and an image detail level measure, for the capturing of one or more subsequent thermal images. The thermal image capturing frame rate may be changed or kept unchanged (altered or unaltered) from the previous frame rate dependent on the values of these measure and on predetermined rules for adapting the frame rate further described below.

At block 340, capturing one or more subsequent thermal images at the determined frame rate for the video sequence to improve the image quality in the video sequence. The subsequent one or more thermal images that are captured at the determined, possibly adapted, frame rate are used for the video sequence output in block 350. The output video sequence of thermal images may be stored or communicated at a selected or standard frame rate for display or storage. As indicated in FIG. 3, capturing of thermal images continues as in block 310 and with processing as in block 320.

Further examples and optional variants of the method in accordance with one or more embodiments are described with reference to FIG. 1 and FIG. 2.

Detail Measure Determination

When a sequence of thermal images are captured depicting an observed scene, each thermal image may comprise a various amount of details or features, for example corners or edges. One or more embodiments are configured to provide better representation of such features by controlling the capturing of thermal images to be performed at a lower frame rate and thus with a longer integration time. For example, more details may be desired to be visible when the current circumstances and current frame rate render low contrast images. Conversely, the amount of details comprised in an image may be controlled to be reduced by using a higher frame rate and thus a shorter integration time for capturing thermal images. For example, less detail in the image may be desired when a high amount of details make it difficult to discern objects of importance, such as in surveillance applications.

The detail measure determiner 210 is configured to determine an image detail measure representing an amount of details or features in a current thermal image. In embodiments as illustrated in FIG. 2, the detail measure determiner 210 is configured to communicate the image detail measure to the frame rate controller 220.

In embodiments, the image detail measure may for example be based on a temporal thermal image average generated for the current thermal image in the thermal image processing component 204. In an example, estimation of the occurrence or the amount of details in the image represented by the image detail measure may be based on edge detection techniques to detect the occurrence and/or the amount of edges in the thermal images to produce an edge detection measure, below also denoted with the abbreviation EDM. For example, determining an edge detection measure EDM may comprise applying a Prewitt operator or a Sobel operator, as would be understood by a skilled person. In embodiments, the image detail measure is determined by determining a pixel-wise edge detection measure for pixels of a currently processed thermal image, for example for each or all pixels of a current thermal image.

In embodiments, the image detail measure for a thermal image may be determined based on a current thermal image and on a previously captured thermal image. The image detail measure may for example be determined as:

image detail measure=$k$*sum(EDM(thermal image$_N$)
AND EDM(thermal image$_{N-1}$))

In this relation, the sum function sums up all elements of the elements or pixel values in the thermal image; k is a predetermined constant used to scale the result of the sum function, for example 1/number_of_pixels, where number_of_pixels refers to the number of pixels in the thermal image, the current thermal image has a first temporal index $T_n$ and the previously captured thermal image has a second temporal index $T_{n-1}$. In other embodiments, the image detail measure may be determined based on a sum operation on each pixel or may be based on values extracted from a histogram of a current image.

Motion Measure Determination

When a sequence of thermal images are captured depicting an observed scene, each thermal image may be affected by motion. Motion effects in the thermal images may for example be due to the presence of moving objects within the scene or due to relative movement of the thermal imaging apparatus in relation to the observed scene. Such motion may cause motion blur in the captured images for example when the image capturing frame rate is low and the integration time is long. One or more embodiments are configured to improve image quality and reduce motion blur by controlling, by means of the frame rate controller 220, the capturing of thermal images to be performed at a higher image capturing frame rate. The motion measure determiner 212 is in such embodiments configured to receive a current thermal image and determine an image motion measure representing a degree of motion in the current thermal image, and to communicate the image motion measure to the frame rate controller 220.

In one or more embodiments, the image motion measure determination may be based on, and comprise detecting effects of, motion in an image by difference image calculation, i.e. calculating the difference between two or more subsequent images. Determining an image motion measure based on difference images entails low computational complexity. Such embodiments would comprise generating one or more difference images based on a current thermal image and one or more previous thermal images of a sequence of captured thermal images. The difference images may be generated based on subsequent, possibly consecutive, thermal images in such a sequence. For example, three or more thermal images may be used to generate one or more difference images and/or combinations of difference images for determining an image motion measure.

In one embodiment using difference images, the motion measure may be generated as:

first difference image = $EDM$(thermal image $PixelValues_{N-1}$) −

$EDM$(thermal image $PixelValues_{N-2}$))

second difference image = $EDM$(thermal image $PixelValues_N$) −

$EDM$(thermal image $PixelValues_{N-1}$))

combined difference image = first difference image pixel values − second difference image pixel values

In this relation, N, N−1 and N−2 denote the temporal indices of the images in the video sequence. EDM is an edge detection measure function or relation as described above in relation to the detail measure determiner 210. PixelValues$_N$ denotes pixel values of a current thermal image, PixelValues$_{N-2}$ denote pixel values of a previous thermal image, and PixelValues$_{N-3}$ denotes pixel values of a further previous thermal image. Where the difference "−" function, "−" that is minus operator, is applied pixel-wise to pixel values with the same or corresponding pixel coordinates, for example where corresponding coordinates are determined by a pixel coordinate transform function or parallax function.

In embodiments the image motion measure may for example be determined based on a combined difference image for example as:

image motion measure=$k$*sum(combined difference image pixel values)

In this relation, the sum function sums up all elements or pixel values; k is a predetermined constant used to scale the result of the sum function, for example 1/number_of_pixels, where number_of_pixels refers to the number of pixels in the thermal image.

In embodiments, the motion measure may for example be set to indicate that motion is detected when effects of motion are detected in a current image, and otherwise the motion measure is set to indicate that no motion is detected, similar to a 0 or 1 status indication. In other embodiments, the image motion measure may be set to a value on a selected scale for example between 0 and 1 to indicate a degree of motion effects in a current thermal image.

In further embodiments, determining an image motion measure may be based on for example an image sharpness or image blurriness measure, such as Kurtosis based, derivative based approaches involving calculation of edge-width, variance based, histogram based, power spectrum based measures and wavelet based techniques, as would be understood by a person in the art.

Image Signal Measure Determiner

When thermal images depicting an observed scene are captured in a sequence, each thermal image in the sequence may comprise pixels representing varying signal levels or intensity levels of incident thermal radiation. The signal levels may for example depend on the applied integration time of the thermal imaging system 113, weather conditions and/or ambient air temperature. One or more embodiments are configured to improve image quality by controlling the thermal imaging apparatus to operate with a suitable frame rate and to keep signal levels within a desired span that is appropriate for the imaged scene and/or the use case application. The signal measure determiner 230 is in such embodiments configured to receive a thermal image and determine an image signal measure representing signal levels or intensity levels in the thermal image. Relations for suitable frame rates and appropriate signal levels for imaged scenes and/or use case applications may for example be selected by a skilled operator and be preset or stored in a look-up-table.

The controlling of signal levels to a desired span or range is based on the understanding that if signal levels are too high or the sensor elements in the sensor/detector 1132 are saturated, then thermal images with reduced image quality will be captured. For thermal images captured under such circumstances, it will no longer be possible to differentiate thermal radiation intensity above the saturated level. In embodiments, this saturation is resolved by controlling the thermal imaging system 113 to reduce the integration time of the IR imaging system 113 by increasing the image capturing frame rate. Further, if image signal levels from objects in the scene are too low, this will also result in the effect that thermal images with reduced image quality are captured. For thermal images captured under these circumstances, it will be difficult to differentiate objects in the captured or depicted scene from the background. In embodiments, the problems with low image signal levels are resolved by increasing the integration time of the sensor/detector 1132 of the IR imaging system 113.

In embodiments, determining an image signal measure is based on one or more of:

the maximum pixel value of at least one thermal image. For example, the image signal measure may be set to a determined maximum pixel value.

the minimum pixel value of at least one thermal image. For example, the image signal measure may be set to a determined minimum pixel value.

the average pixel value of at least one thermal image. For example, the image signal measure may be set to the determined average pixel value.

The respective maximum, minimum and/or average pixel values may be determined for example for the current thermal image and possibly one or more previously captured and/or subsequently captured thermal images in a sequence. In embodiments, an image signal measure may for example be set to the maximum, minimum and/or average pixel value possibly multiplied with a scaling factor, to a combination of the minimum, maximum and/or average pixel values, to a difference between one or more of the minimum, maximum and/or average pixel values, or to a value calculated based one or more of the minimum, maximum and/or average pixel values.

In one or more embodiments, determining an image signal measure alternatively or further comprises generating a histogram based on the pixel values of a thermal image, and determining an image signal measure based on the histogram. In embodiments, the histogram comprises bins in a lower tail, central bins and bins in an upper tail. The lower tail represents a selection of consecutive bins representing the lowest image signal values of the pixel values in thermal image or in a temporal average of one or more thermal images. The upper tail represents a selection of consecutive bins representing the highest image signal values of the pixel values in thermal image or in a temporal average of one or more thermal images. The central bins represent a selection of consecutive bins representing image signal values of the pixel values in thermal image or temporal average not included in the lower tail or upper tail.

In some embodiments, the upper and/or lower tails of the histogram are excluded when determining an image signal measure based on a histogram and, for example, determining an image signal measure may be based exclusively on the central bins. In embodiments, the image signal measure is determined as the signal value associated with a minimum, a maximum or an average bin of the histogram. In one example, the pixel values of a thermal image are assigned to bins in the histogram, the highest and lowest bins are rejected and a mean pixel value is determined based on the remaining bins. The image signal measure may for example be set to the mean pixel value.

User Parameter Input

The user parameter interface 216 is in one or more embodiments configured to receive user input in the thermal image evaluator 208. Such user input may comprise control commands, parameters or settings for example indicating a certain use case or indicating conditions of the observed scene. In one or more embodiments, such user input is used to control the operations of the detail measure determiner 210 and/or the motion measure determiner 212 or the signal level determiner 214 and/or the frame rate controller 220. The user input may for example comprise or select parameters such as threshold values used in one or more of the image detail determiner, the motion measure determiner, the signal level determiner and/or the frame rate controller.

Adaptive Frame Rate Controller

As discussed above, the thermal imaging apparatus 110 operates in capturing a sequence of thermal images at a certain frame rate. The available integration time of the thermal radiation detector 1132 of the thermal imaging system 113 is limited by the frame rate. In one or more embodiments, the integration time and thereby the thermal image quality is controlled by dynamically adapting the image capturing frame rate. The frame rate controller 220 is configured to determine an adapted image capturing frame rate based one or more of the received measures and/or user input parameters, and is configured to control the thermal image capturing frame of the thermal imaging system 113.

In one or more embodiments, the image capturing frame rate controller 220 is configured to automatically control the thermal imaging system 113 to operate in accordance with the determined image capturing frame rate. In other embodiments, the determined image capturing frame rate is presented to a user of the thermal imaging apparatus 110 as a recommended setting for further manual input to control the image capturing frame rate controller of the thermal imaging apparatus 110.

In one or more embodiments, the image capturing frame rate controller 220 comprises determining, or is configured to determine, an adapted frame rate by determining an integration time for the capturing of thermal images that is appropriate for imaging the scene, where the integration time is determined based on one or more sets of rules and on one or more of the image detail measure, the image motion measure and/or the image signal measure. The frame rate is then determined based on the determined integration time. Optionally, determining the integration time may also or alternatively be based on a possible user input parameter. A frame rate resulting in the integration time determined to be appropriate for the current scene is then determined, and used for the capturing of subsequent thermal images. In embodiments, an appropriate integration time is found when the image quality aspects in the form of image detail measure, image motion measure and image signal measure conditions can be calculated to be fulfilled. For example, the image capturing frame rate may be determined to result in an integration time equal to minimum and/or to maximum threshold values for the integration time. The threshold values may be calculated based on values for the respective determined measures, or be selected from pre-stored threshold values for example in a look-up-table stored in a memory 115, or selected from parameters manually input via user input interface 216. In one example, a relatively low image detail measure is determined and therefore the integration time is determined to the maximum integration time threshold. In another example, a relatively high image detail measure is determined and therefore the integration time is determined to the minimum integration time threshold. A corresponding image capturing frame rate is then determined, for example calculated or by means of a look-up-table, based on the determined integration time.

In one or more embodiments, an adapted image capturing frame rate is determined in a stepwise manner. In such embodiments, the behavior of the image capturing frame rate controller 220 when determining an updated frame rate is regulated by step conditions for stepping up or down the image capturing frame rate. The step conditions reflect different aspects of image signal level, image detail level and motion of objects in the scene or motion of the thermal imaging apparatus 110 relative to the scene. If one or more predefined step conditions are fulfilled, the frame rate is stepped up or down by an image capturing frame rate step, here called delta_frame_rate denoted $\Delta FR$, having a preset or pre-settable size. The frame rate step delta_frame_rate $\Delta FR$ may for example be stored in memory 115 and available for the image capturing frame rate controller 220. In embodiments, determining an adapted frame rate comprises: determining, based on one or more of the image detail measure, the image motion measure and/or the image signal level measure, whether a frame rate step condition is satisfied. If a negative step condition (e.g., a condition appropriate for decreasing the frame rate by some step) is fulfilled, the current frame rate is decreased by a step value delta_frame_rate to an adapted frame rate. If a positive step condition (e.g., a condition appropriate for increasing the frame rate by some step) is fulfilled, the current frame rate is increased by a step value delta_frame_rate to an adapted frame rate.

For example, in controlling the image capturing frame rate with regard to the image signal level, it may be desirable to capture thermal images keeping a maximum pixel value $S_{max}$ below a maximum pixel value threshold Ths-high, a minimum pixel value $S_{min}$ above a minimum pixel value threshold Ths-low, and/or an average pixel value $S_{average}$ within a range of for example plus/minus ($\pm$) a delta_average_pixel_value $\Delta S_{average}$ around an average pixel value threshold Ths-average. In an example, the image signal level measure indicates that a maximum pixel value is above a maximum pixel value threshold Ths-high, which indicates that there is risk for saturation of the thermal radiation detector 1132 and a poor quality in the captured thermal images. A positive step condition is therefore fulfilled and the image capturing frame rate is controlled to be increased by delta_frame_rate $\Delta FR$ for capturing subsequent thermal images. In another example, the image signal level for a current thermal image being evaluated is determined to be below a minimum signal level threshold Ths-low. A negative step condition is therefore fulfilled and the image capturing frame rate is decreased by delta_frame_rate $\Delta FR$ for capturing subsequent thermal images. This may also be described as an example of a set of rules for controlling an adapted image capturing frame rate: updating an image capturing frame rate for a current thermal image to frame_rate$_{N+1}$=frame_rate$_N$+$\Delta FR$, when a positive step condition is fulfilled; or to frame_rate$_{N+1}$=frame_rate$_N$−$\Delta FR$, when a negative step condition is fulfilled, wherein frame_rate$_N$ denotes the current frame rate used to capture a current thermal image having a temporal index N and frame_rate$_{N+1}$ denotes the frame rate determined for capturing subsequent thermal images having temporal indices N+1.

In a further example, the image capturing frame rate is controlled with regard to the image signal level and the image detail level. If the signal level is within minimum and maximum thresholds and there is a high level of details in the IR image, the image quality may be improved by increasing the image capturing frame rate. Step conditions for increasing the image capturing frame rate may in this example be described as:

if a minimum signal threshold Ths-low$\leq$image signal level measure S$\leq$a maximum signal threshold Ths-high; and the image detail measure S$\geq$a high detail threshold Thk-high, then increase the image capturing frame rate.

In another example, the image capturing frame rate is controlled with regard to the image signal level, the image detail level and the degree of motion in the image. If the image signal level is within minimum and maximum thresholds, the image detail level is within minimum and maximum thresholds and there is a detected motion or a high level of motion in the thermal image, the image quality may be improved by increasing the image capturing frame rate. Step conditions for increasing the image capturing frame rate may in this example be described as:

if a minimum signal threshold Ths-low≤image signal level measure S≤a maximum signal threshold Ths-high; and a low detail threshold Thk-low≤the image detail measure≤a high detail threshold Thk-high; and a motion threshold Ths image motion≤motion measure, then increase the image capturing frame rate.

In other examples, such as when the image signal level is below a minimum threshold the image quality may be improved by decreasing the image capturing frame rate. Step conditions for decreasing the image capturing frame rate may in this example be described as:

if image signal level measure≤a minimum signal threshold Ths-low, then decrease the image capturing frame rate.

In another example, such as when the image signal level is within minimum and maximum thresholds and there is a low level of details in the thermal image, the image quality may be improved by reducing the frame rate. Step conditions for decreasing the image capturing frame rate may in this example be described as:

if a minimum signal threshold Ths-low≤image signal level measure≤a maximum signal threshold Ths-high; and the image detail measure≥a low detail threshold Ths-low, then decrease the image capturing frame rate.

Output Thermal Image Video Sequence

In one or more embodiments, the frame rate for capturing thermal images is controlled independently of the frame rate for an output thermal image video sequence. Again referring to the exemplifying illustration in FIG. 2, a sequence of thermal images 200 captured at an adaptive frame rate is in such embodiments configured, by the thermal image processing 204 stage, into an output thermal image video sequence 212 having an output video frame rate. The output video frame rate may be matched to or required by the output thermal image video interface 206 or a (not shown) display for video presentation. In one example, the output thermal image video sequence 212 may be stored on a memory at a selected output video frame rate. For example, an output video frame rate may be 30 or 60 Hertz (Hz). The adaptively controlled image capturing frame rate may be in the range between for examples 0 to 120 Hertz (Hz) or as in another example even up to 1200 Hertz (Hz). The available range of image capturing frame rate depends on the circuitry of the thermal imaging apparatus and at what speed pixel values can be read out from the thermal radiation detector to the processing components.

Figure 4A:
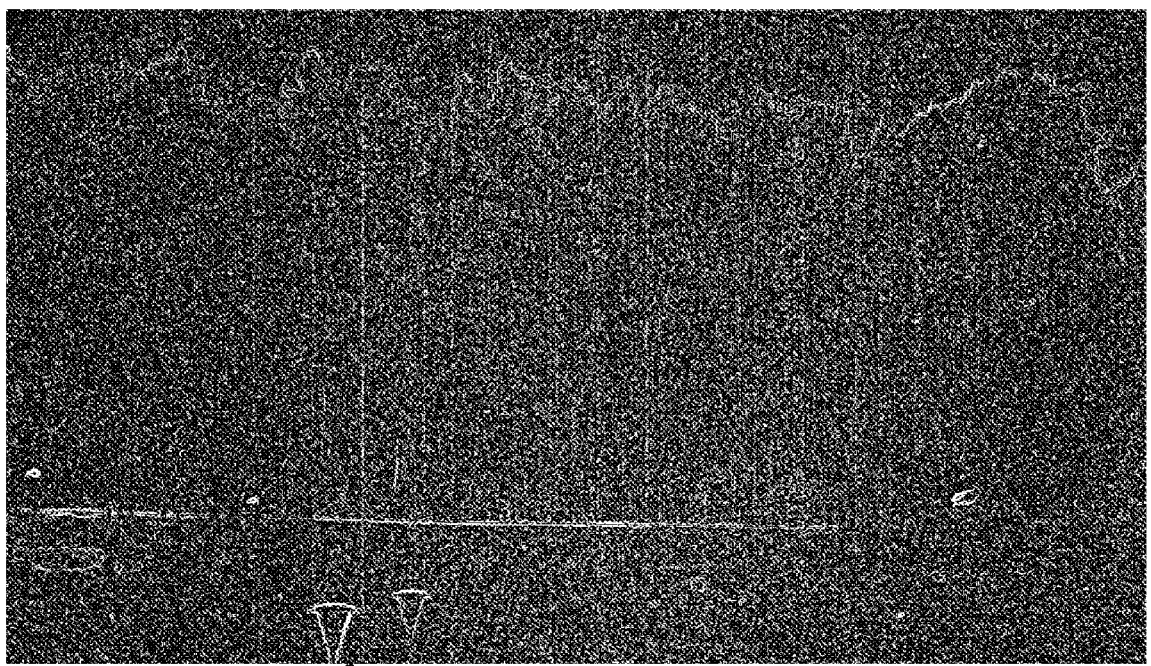
FIG. 4A shows an example of a low contrast thermal image in the form of an IR image from a sequence of captured thermal images according to one or more embodiments of the disclosure.
Figure 4B:
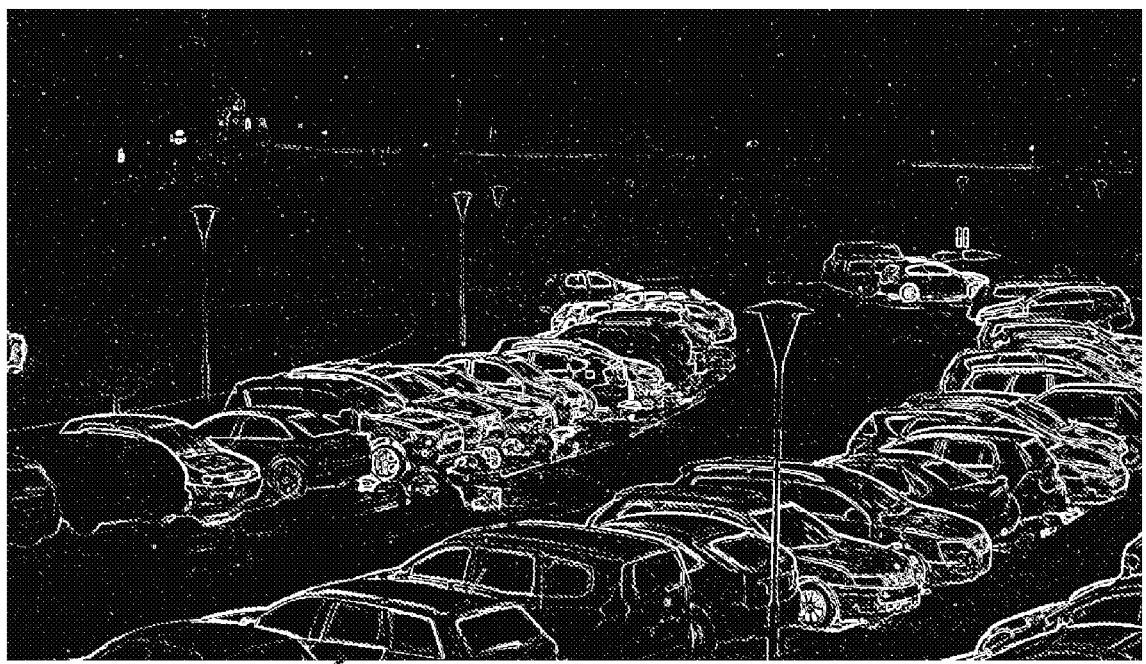
FIG. 4B shows an example of a subsequent thermal image in the sequence in the form of a high contrast IR image captured with an adapted frame rate according to one or more embodiments of the disclosure.

FIG. 4A shows an example of a low contrast thermal image 410 in the form of an IR image from a sequence of thermal images captured without an adapted capturing frame rate of the disclosure. As can be seen in FIG. 4A, the low contrast characteristic of the thermal image 410 makes it difficult to differentiate objects from the background in the captured depicted scene. It can further be seen that there is a low level of image details, whereas it is not possible to see whether there is motion in the scene or not. In one or more embodiments of the methods and systems herein applied on the thermal image 410, the thermal image evaluation would result in the detail measure having a low value, the signal level measure having a low value and, since the scene lacked perceivable motion occurrence in this instance, the motion measure also having a low value. The thermal image capturing would then in this example be adapted to operate with a decreased frame rate, and consequently with an increased integration time, for capturing further subsequent thermal images. FIG. 4B shows an example of a subsequent thermal image 412 captured with an adapted thermal image capturing frame rate, one or more of frames temporally later in a sequence of captured thermal images. As can be seen in FIG. 4B, the resulting thermal image shows a higher contrast thermal image characteristic that makes it easier to differentiate objects in the captured or depicted scene from the background. It can further be seen that in the resulting thermal image there is a higher level of image details.

Further Embodiments

According to embodiments, there is provided a computer-readable medium on which is stored non-transitory information configured to control a processor to perform any of the steps or functions of the invention described herein. According to embodiments, there is provided a computer program product comprising code portions adapted to control a processor to perform any of the steps or functions of the invention described herein.

Software in accordance with the present disclosure, such as program code and/or data, can be stored in non-transitory form on one or more machine-readable mediums. It is also contemplated that software identified herein can be implemented using one or more general purpose or specific purpose computers and/or computer systems, networked and/or otherwise.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A method of improving image quality in a video sequence of thermal images captured using a thermal imaging system, the method comprising:

determining one or more of an image detail level and/or an image signal level of one or more captured thermal images, wherein the determining of the image detail level comprises determining an image detail measure, and wherein the determining of the image signal level comprises determining an image signal level measure;

determining, based on one or more of the determined image detail measure and/or the determined image signal level measure, an adapted frame rate for capturing of one or more subsequent thermal images for the video sequence, wherein the adapted frame rate is adjusted if the image signal level measure is less than a signal threshold; and capturing the one or more subsequent thermal images at the adapted frame rate to improve the image quality in the video sequence.

2. The method of claim 1, wherein the determining one of more of the image detail level and/or the image signal level comprises determining the image detail level, and wherein the determining of the image detail measure comprises determining an edge detection measure.

3. The method of claim 2, wherein the determining of the edge detection measure is based on a Prewitt operator or a Sobel operator.

4. The method of claim 1, further comprising:
determining a degree of image motion based on difference image calculation, wherein the adapted frame rate is further based on the degree of image motion; and
configuring a sequence of the captured thermal images into an output video sequence having an output video frame rate.

5. The method of claim 1, further comprising:
determining an image motion measure based on one or more of an image sharpness measure and/or an image blurriness measure, wherein the adapted frame rate is further based on the image motion measure; and
generating a histogram based on pixel values of at least one thermal image, wherein:
the histogram comprises a first set of bins associated with lower image signal values of the one or more captured thermal images, a second set of bins associated with higher image signal values of the one or more captured thermal images, and a third set of bins associated with image signal values between the lower image signal values of the first set of bins and the higher image signal values of the second set of bins; and
the determining the image signal level measure is based on the third set of bins and excludes the first and second set of bins.

6. The method of claim 1, wherein the determining one of more of the image detail level and/or the image signal level comprises determining the image signal level, and wherein the determining of the image signal level measure is based on one or more of:
a maximum pixel value based on pixel values of at least one thermal image; and/or
a minimum pixel value based on pixel values of at least one thermal image; and/or
an average pixel value based on pixel values of at least one thermal image.

7. The method of claim 1, further comprising:
determining a first edge detection measure of a first thermal image of the one or more captured thermal images;
determining a second edge detection measure of a second thermal image of the one or more captured thermal images temporally adjacent to the first thermal image, wherein the image detail measure is based on a sum of the first and second edge detection measures;
receiving a user parameter via a user parameter input interface; and
controlling, based on the received user parameter, the determining of one or more of the image detail measure, the image signal level measure and/or the adapted frame rate.

8. The method of claim 1, wherein the determining of the adapted frame rate comprises:
determining, based on a set of rules and on one or more of the image detail measure and/or the image signal level measure, an integration time for the capturing of thermal images for imaging a scene; and
determining the adapted frame rate based on the determined integration time.

9. The method of claim 1, wherein the determining one of more of the image detail level and/or the image signal level comprises determining the image detail level and the image signal level, and wherein the determining of the adapted frame rate comprises:
determining, based on the image detail measure and the image signal level measure, whether a frame rate step condition is fulfilled;
decreasing, if a negative step condition is fulfilled, a current frame rate by a step value delta_frame_rate to the adapted frame rate; and
increasing, if a positive step condition is fulfilled, the current frame rate by the step value delta_frame_rate to the adapted frame rate.

10. A non-transitory machine-readable medium on which is stored machine-readable code which, when executed by a processor of a thermal imaging apparatus, causes the processor to perform the method of claim 1.

11. A thermal imaging apparatus comprising:
a thermal imaging system configured to capture one or more thermal images for a video sequence imaging a scene;
a processor communicatively coupled to the thermal imaging system, the processor being configured to:
determine one or more of an image detail level and/or an image signal level of one or more captured thermal images, wherein the determining of the image detail level comprises determining an image detail measure, and wherein the determining of the image signal level comprises determining an image signal level measure;
determine, based on one or more of the determined image detail measure and/or the determined image signal level measure, an adapted frame rate for capturing of one or more subsequent thermal images for the video sequence, wherein the adapted frame rate is adjusted if the image signal level measure is less than a signal threshold; and
capture the one or more subsequent thermal images at the adapted frame rate to improve an image quality in the video sequence.

12. The thermal imaging apparatus of claim 11, wherein the determining one of more of the image detail level and/or the image signal level comprises determining the image detail level, and wherein the determining of the image detail measure comprises determining an edge detection measure based on a Prewitt operator or a Sobel operator.

13. The thermal imaging apparatus of claim 11, wherein the processor is further configured to determine an image motion measure based on difference image calculation, wherein the determining one of more of the image detail level and/or the image signal level comprises determining the image signal level, and wherein the determining of the image signal level measure is based on one or more of:
a maximum pixel value based on pixel values of at least one thermal image; and/or
a minimum pixel value based on pixel values of at least one thermal image; and/or
an average pixel value based on pixel values of at least one thermal image.

14. The thermal imaging apparatus of claim 11, wherein the processor is further configured to generate a histogram based on pixel values of at least one thermal image, wherein the image signal level measure is based on the histogram, and wherein the processor is further configured to:

receive a user parameter via a user parameter input interface; and control, based on the received user parameter, the determining of one or more of the image detail measure, the image signal level measure and/or the adapted frame rate.

15. The thermal imaging apparatus of claim 11, wherein the determining of the adapted frame rate comprises:

determining, based on a set of rules and on one or more of the image detail measure and/or the image signal level measure, an integration time for the capturing of thermal images for imaging the scene; and determining the adapted frame rate based on the determined integration time.

16. The thermal imaging apparatus of claim 11, wherein the determining of the adapted frame rate comprises:

determining, based on one or more of the image detail measure and/or the image signal level measure, whether a frame rate step condition is fulfilled;

decreasing, if a negative step condition is fulfilled, a current frame rate by a step value delta_frame_rate to the adapted frame rate; and increasing, if a positive step condition is fulfilled, the current frame rate by the step value delta_frame_rate to the adapted frame rate; and wherein the processor is further configured to configure a sequence of the captured thermal images into an output video sequence having an output video frame rate.

17. The method of claim 1, wherein the determining one of more of the image detail level and/or the image signal level comprises determining the image detail level and the image signal level, and wherein the adapted frame rate is adjusted further based on:

an image detail threshold and the image detail measure.

* * * * *